US007802947B2

(12) United States Patent
Endres

(10) Patent No.: US 7,802,947 B2
(45) Date of Patent: Sep. 28, 2010

(54) CUTTING TOOL INSERT HAVING INTERNAL MICRODUCT FOR COOLANT

(75) Inventor: William J. Endres, Houghton, MI (US)

(73) Assignee: Michigan Technological University, Houghton, MI (US)

( * ) Notice: Subject to any disclaimer, the term of this patent is extended or adjusted under 35 U.S.C. 154(b) by 680 days.

(21) Appl. No.: 11/746,186

(22) Filed: May 9, 2007

(65) Prior Publication Data
US 2008/0279644 A1 Nov. 13, 2008

(51) Int. Cl.
*B23B 27/00* (2006.01)
*B23B 27/02* (2006.01)
(52) U.S. Cl. ...................... 407/113; 407/115
(58) Field of Classification Search .......... 407/113–116
See application file for complete search history.

(56) References Cited

U.S. PATENT DOCUMENTS

| | | | | |
|---|---|---|---|---|
| 3,359,837 A | * | 12/1967 | Andreasson | 408/230 |
| 3,434,554 A | * | 3/1969 | Bower, Jr. | 175/420.1 |
| 4,151,869 A | | 5/1979 | Halloran et al. | |
| 4,621,547 A | | 11/1986 | Yankoff | |
| 5,275,633 A | | 1/1994 | Johansson et al. | |
| 5,775,854 A | | 7/1998 | Wertheim | |
| 5,799,553 A | | 9/1998 | Billatos | |
| 5,901,623 A | * | 5/1999 | Hong | 82/50 |
| 6,117,612 A | | 9/2000 | Halloran et al. | |
| 6,634,835 B1 | | 10/2003 | Smith | |
| 6,637,984 B2 | | 10/2003 | Murakawa et al. | |
| 2007/0283794 A1 | * | 12/2007 | Giannetti | 82/158 |
| 2007/0286689 A1 | * | 12/2007 | Giannetti | 407/11 |

FOREIGN PATENT DOCUMENTS

EP 599393 A1 * 6/1994

OTHER PUBLICATIONS

Zhao, H. et al., "A study of flank wear in orthogonal cutting with internal cooling", Elsevier Science B.V., www.elsevier.com/locate/wear, Wear 253 (2002) 957-962.
Chiou, Richard Y. et al., "The Effect of an Embedded Heat Pipe in a Cutting Tool on Temperature and Wear", Proceedings of IMECE, 2003 ASME International Mechanical Engineering Congress & Exposition, Nov. 15-21, 2003, Washington, D.C.

(Continued)

*Primary Examiner*—Will Fridie, Jr.
(74) *Attorney, Agent, or Firm*—Michael Best & Friedrich LLP

(57) ABSTRACT

A cutting tool insert includes: a body defining a rake face, a flank face, and a cutting edge at an intersection of the rake and flank faces; and a cooling microduct within the body. A portion of the microduct extends along the cutting edge not more than 0.5 millimeter from the rake face, and not more than 0.5 millimeter from the flank face. The microduct has a cross-sectional area of not more than 1.0 square millimeter. The microduct is adapted to permit the flow of a coolant therethrough to transfer heat away from the cutting edge and extend the useful life of the insert. Secondary conduits having cross-sectional area no larger than 0.004 square millimeter may communicate between the microduct and the rake and/or flank face to exhaust coolant behind the cutting edge and further enhance cooling.

16 Claims, 7 Drawing Sheets

OTHER PUBLICATIONS

Jeffries, Dr. Neal P., et al., "Internal Cooling of Metal-Cutting Tools", Technical Paper, Society of Manufacturing Engineers.

Maekawa, Katsuhiro et al., "Thermal Analysis of Internally Cooled Cutting Tools", [JSPE-57-11] ['91-11-2011].

Reznikov, A.N. et al., "How Internal Cooling Affects The Temperature and Life of Cutting Tools", 1 i Instrument, 60, No. 4, pp. 18-20, 1989, 21.9.02.014.2.

Maekawa, Katsuhiro et al., "Finite Element Analysis of Temperature and Stresses within an Internally Cooled Cutting Tool", Bull. Japan Soc. of Prec. Engg., vol. 23, No. 3 (Sep. 1989).

Jeffries, Neal P. et al., "New Internal Cooling Method Cuts Turning Tool Wear", Cutting Tool Engineering, vol. 22, Issue 9 (Sep. 1970), pp. 8-10.

Reznikov, A. N. et al., "Cutting Tools with a Self-Cooling System", Stanki i Instrument, vol. 58, Issue 2, 1987, pp. 18 and 19.

Celata, G.P., et al., 2000, "Experimental Investigation of Hydraulic and Single-Phase Heat Transfer in 0.13 mm Capillary Tube," Proc., Intl. Conf. Heat Transfer and Transport Phenom. In Microscale, Banaff, Canada, 108-113.

Gao, P., et al., 2002, "Scale effects on hydrodynamics and heat transfer in two-dimensional mini and microchannels," International Journal of Thermal Sciences, Grenoble, France, 1017-1027.

Lelea, D., et al., 2004, "The Experimental Research on Microtube Heat Transfer and Fluid Flow of Distilled Water," Int. J. Heat Mass Transfer, 47, 2817-2830.

Peng, X. F., et al., 1995, "The Effect of Thermofluid and Geometrical Parameters on Convection of Liquid through Conventional Microchannel," Int. J. Heat and Mass Transfer, 38, 127-137.

PCT Search Report and Written Opinion for International Application No. PCT/US2008/062753, 12 pages, Dated Aug. 21, 2008.

\* cited by examiner

CUTTING TOOL INSERT HAVING INTERNAL MICRODUCT FOR COOLANT

BACKGROUND

The present invention relates to a cutting tool insert having an internal microduct through which coolant flows to transfer heat away from the cutting edge and extend the useful life and productivity of the insert.

The cutting edge of a cutting tool contacts the work piece and performs the actual cutting. While in operation, a large quantity of heat is generated at the cutting edge. Prolonging the life of the cutting tool and operating the cutting tool at high speed requires cooling while the cutting tool is in operation, especially when the cutting tool is used to cut materials such as hardened steel, titanium, and nickel-based high-temperature alloys. A conventional method of cooling includes, for example, "flood" cooling, where a steady stream of coolant is splashed on the work piece and the cutting tool while in operation. This method of cooling is not very effective, as it provides indirect cooling of the cutting tool edge, as it is obstructed by the chip, and requires a relatively complex recycling system to salvage, filter, and reuse the excessive quantities of coolant used.

It is also known to flow a coolant through cooling conduits in a cutting tool insert. However, known assemblies employ conduits having cross-sectional dimensions on the milliscale, and require relatively large flow rates of coolant. Because of their relatively large size, such known cooling conduits can only be positioned a certain distance from the rake face, flank face, and cutting edge without affecting the structural strength of the cutting tool insert. Such known cooling milliducts are focused on cooling the entire cutting tool insert, rather than focusing on transferring heat away from the cutting edge itself.

SUMMARY

In one embodiment, the invention provides a cutting tool insert comprising: a body defining a rake face, a flank face, and a cutting edge at an intersection of the rake and flank faces; and a cooling microduct within the body, a portion of the microduct extending along the cutting edge not more than 0.5 millimeter from the rake face and not more than 0.5 millimeter from the flank face, the cooling microduct having a cross-sectional area of not more than 1.0 square millimeter, the microduct being adapted to permit the flow of a coolant therethrough to transfer heat away from the cutting edge and extend the useful life of the insert.

In another embodiment, the invention provides a method for manufacturing a cutting tool insert, the method comprising: forming a first portion having a first mating surface; forming a second portion having a second mating surface; defining an open channel in the first mating surface; placing the first and second mating surfaces into contact with each other to cover the open channel to define a microduct; metallurgically bonding the first and second portions together to define a cutting tool insert having therein the microduct; and defining on the insert a rake face, a flank face, and cutting edge at an intersection of the rake and flank faces, the microduct being not more than 0.5 millimeter from each of the rake and flank faces.

In another embodiment, the invention provides a method for extending the useful life of a cutting tool insert that has a rake face, a flank face, and a cutting edge at an intersection of the rake and flank faces, the method comprising: providing a microduct within the insert, a portion of the microduct extending along the cutting edge and not more than 0.5 millimeter from each of the rake face and flank face, the microduct having a cross-sectional area of not more than 1.0 square millimeter; providing a coolant supply passage in the insert in communication with one end of the microduct; providing at least one exhaust conduit in communication with the microduct; causing a coolant to flow through a portion of the insert through the supply passage and into the microduct; causing the coolant to flow through the microduct to remove heat energy from the cutting edge during cutting operations; and causing the coolant to exhaust from the insert through the at least one exhaust conduit.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The present invention involves very small scale ducting in a cutting tool insert. For the sake of illustration, the drawings are not drawn to scale.

Figure 1:
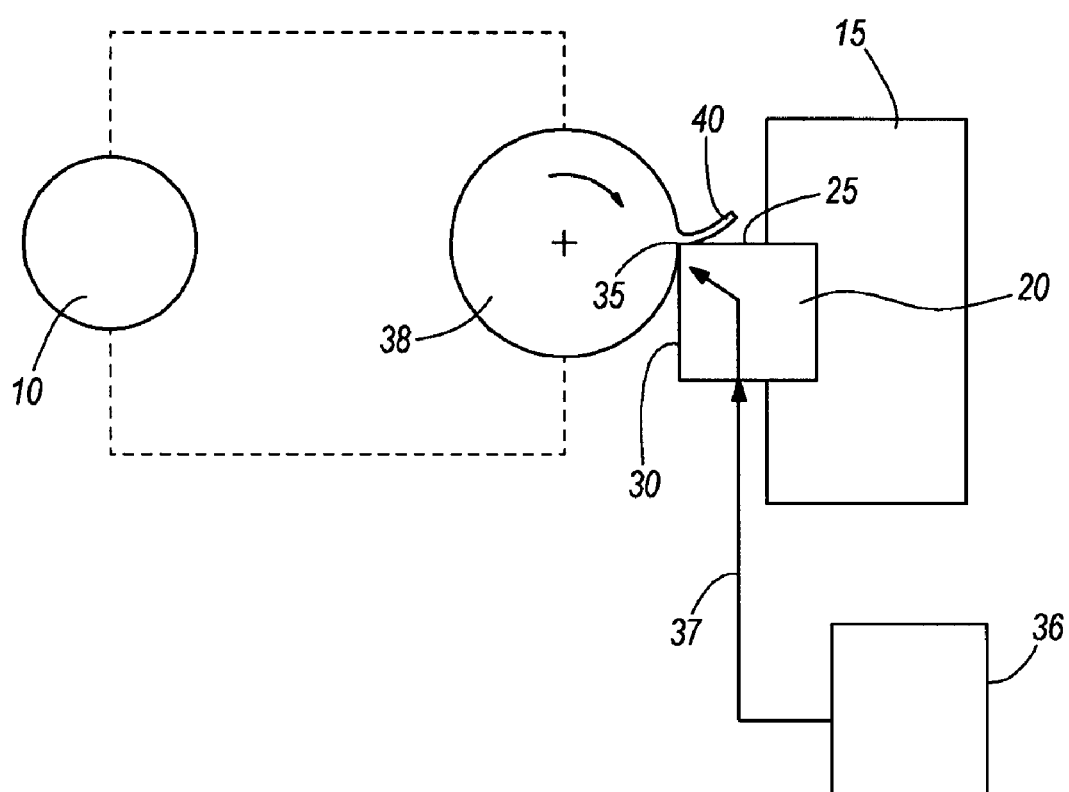
FIG. 1 is a schematic view of a cutting system including an internal microduct cooled cutting tool insert embodying the present invention.

FIG. 1 illustrates a system that includes a prime mover 10 (e.g., a motor), a holder 15, and a cutting tool insert 20 in the holder 15. The cutting tool insert 20 includes a rake face 25, a clearance or flank face 30, and a cutting edge 35 at the intersection of the rake and flank faces 25, 30. The system also includes a source of coolant 36 providing coolant 37 to the insert 20. Mounted in the system is a work piece 38 that is, in the illustrated embodiment, rotated under the influence of the prime mover 10. The insert 20 cuts a chip 40 from the work piece 38 when brought into contact with the work piece 38 or when the work piece 38 is brought into contact with the insert 20. It is envisioned that the insert 20 could be incorporated into a lathe, a mill, a planar, a drill, or any other machine in which stationary or rotational cutting tools are utilized.

Figure 2:
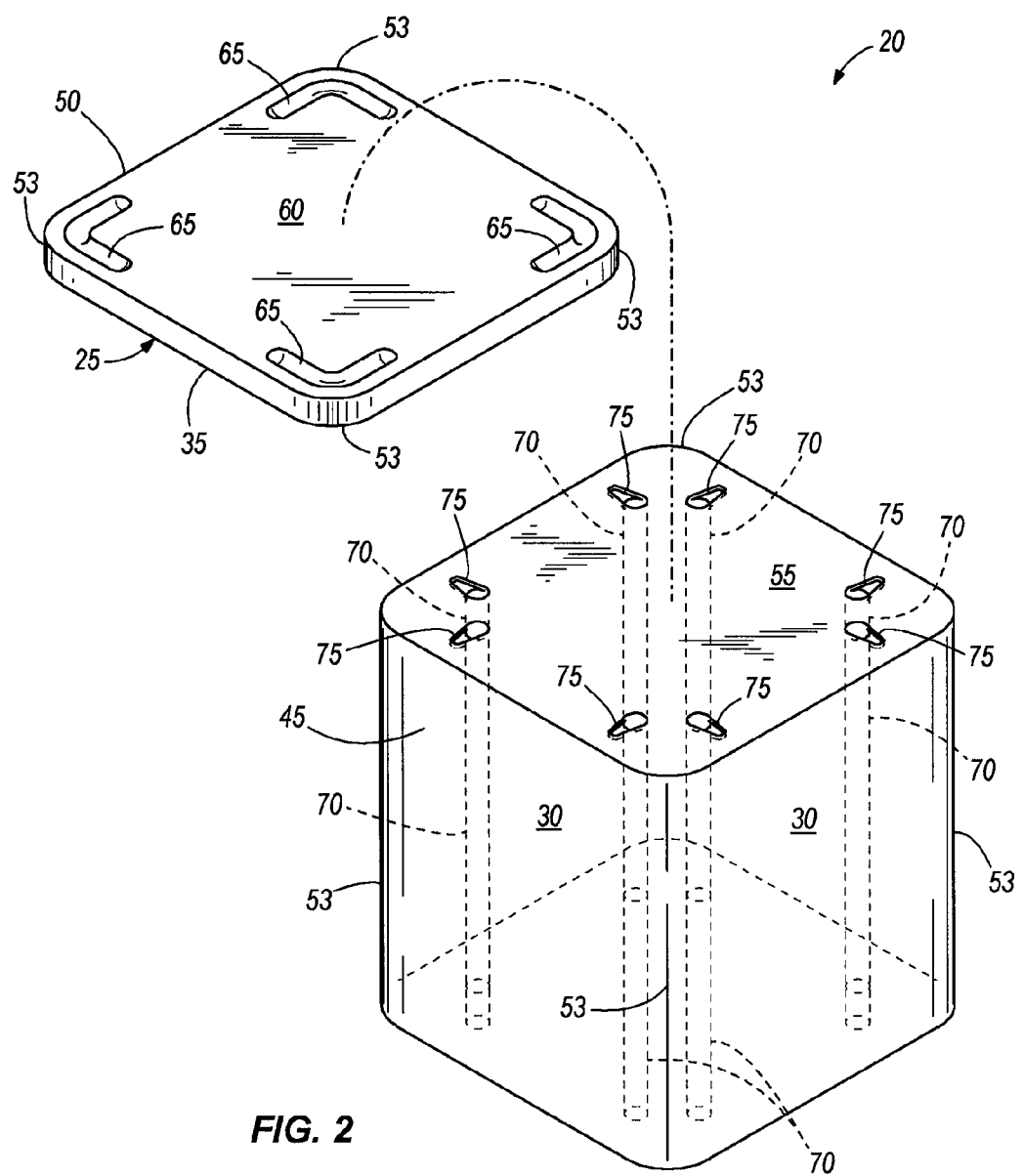
FIG. 2 is a perspective view of the cutting tool insert being assembled.

With reference to FIG. 2, the insert 20 is constructed from a base 45 and a wafer 50. The base and wafer 45, 50 include radiused corners 53. The surface of the wafer 50 facing down in FIG. 2 forms the rake face 25 of the insert 20, and the edge along the perimeter of the rake face 25 forms the cutting edge 35 of the insert 20. Once the insert 20 is assembled, the four sides of the base 45 and wafer 50 together form the flank faces 30. The base 45 and wafer 50 have mating surfaces 55, 60, respectively, that abut against each other when the insert 20 is assembled.

The insert 20 can be used to cut with the portion of the cutting edge 35 along each of the four radiused corners 53, with one side or the other of the radiused corner 53 performing most of the work depending on whether the insert 20 is used in a right-handed or left-handed cutting operation. When the edge 35 along one corner 53 is worn down, the insert 20 can be indexed ninety degrees so that the edge 35 along the next corner 53 can be used. Consequently, the insert 20 can be used four times before it needs to be replaced. In other embodiments, the cutting edge 35 may define a straight line (rather than the illustrated radiused corners).

Formed in the mating surface 60 of the wafer 50 along each of the four radiused corners 53 is an open channel that defines a microduct 65. Extending up from the bottom of the insert 20 generally perpendicular to the rake face 25 and parallel to the flank faces 30 are eight flow passages 70 (a pair near each of the radiused corners 53). The flow passages 70 are sized to receive a standard hose or other conduit fitting to facilitate the flow of coolant 37 into the insert 20. Formed in the mating face 55 of the base 45 are open channels that define eight connecting passages 75, each communicating at one end with an associated flow passage 70.

The base 45 and wafer 50 may be provided, for example, as green-state parts suitable for sintering (the construction of which is discussed below). During assembly, the wafer 50 is placed over the end of the base 45. The open channels forming the microducts 65 are consequently closed by the mating surface 55 of the base 45, and the open channels forming the connecting passages 75 are closed by the mating surface 60 in the wafer 50, such that the microducts 65 and connecting passages 75 are now closed conduits inside the insert 20.

When the base and wafer 45, 50 are properly aligned, the connecting passages 75 communicate between the associated flow passage 70 and an end of an associated microduct 65. The flow passages 70 are substantially larger in cross-section than the microducts 65, and the connecting passages 75 are therefore tapered from a large end communicating with the flow passage 70 to a small end communicating with the microduct 65. The connecting passages 75 act as funnels in this regard. Four coolant flow circuits, each comprising two flow passages 70, two connecting passages 75, and one microduct 65 in fluid communication are therefore created when the wafer 50 is properly positioned on the base 45.

Once properly aligned, the green-state base 45 and wafer 50 are joined by sintering. More specifically, heat is applied to the assembly to metallurgically bond the base 45 and wafer 50 into a unitary, integral, non-separable cutting tool insert 20 having the above-mentioned coolant flow circuits. After sintering, the rake and flank faces 25, 30 may be machined to provide a sharp cutting edge 35. Removing material from the rake and flank faces 25, 30 via machining also effectively moves the microducts 65 closer to those faces 25, 30 and to the cutting edge 35. Machining will therefore permit the microducts 65 to be positioned a desired distance away from the cutting edge 35, rake face 25, and flank face 30.

In the embodiment illustrated in FIG. 2, the microduct 65 is formed in the wafer 50. It will be recognized that the microduct 65 may be formed in either the base 45 or wafer 50, or may be partially formed in each of the base 45 and wafer 50. It is also contemplated by the present invention that the connecting passage 75 may be formed in either or both of the base 45 and wafer 50 so long as fluid communication through the insert 20 is established.

As used herein, "microduct" means a duct having a cross-sectional area of not more than 1.0 square millimeter. In some embodiments, the cross-sectional area may be about 0.07 square millimeter, 0.05 square millimeter, 0.035 square millimeter, or even as small as about 0.025 square millimeter. The microducts may have circular cross-sections with diameters in the range of 250-300 micrometers (0.250-0.300 millimeter), or semi-circular cross-sections (as illustrated) with radii in the range of 125-150 micrometers (0.125-0.150 millimeter), for example. Other cross-sectional shapes are possible for the microduct, such as, for example, squares, rectangles, ovals, hexagons, and other shapes, including irregular shapes. By way of comparison, known "milliducts" used in cutting tool inserts have cross-sectional areas in the range of 1.0-7.0 square millimeters, and may therefore be multiple times larger than the microducts contemplated by the present invention.

The very small size of the microduct 65 permits it to be positioned much closer to the cutting edge 35, rake face 25, and flank face 30 than is possible for known milliducts, while not substantially decreasing the strength of the cutting tool insert 20. For example, the size of a microduct permits it to be positioned within about 100-150 micrometers (0.100-0.150 millimeter) from both the rake face 25 and flank face 30. Because of the close proximity of the microduct 65 to the cutting edge 35, heat is transferred more efficiently from the cutting edge 35 to coolant 37 flowing through the microduct 65 than when known milliducts are used. In this regard, the present invention focuses on cooling the cutting edge 35 specifically and not the insert 20 generally.

Because of the increased efficiency in heat transfer, less coolant 37 is required to maintain the cutting edge 35 within a desired range of operating temperatures than would be required for known tools employing milliducts or flood cooling. Because of the small volumes of coolant 37 used in present invention, it will in most cases not be necessary to recycle coolant 37 to achieve system efficiencies (although depending on the coolant 37, it may be desirable to collect, contain or recycle for other reasons). By way of example, but without limitation, some coolants 37 that may be suitable for use in the present invention are water (tap water at room temperature, for example), oil, liquefied gas, compressed gas, and refrigerant.

For example, the useful life of a cutting tool insert can be increased by flowing room-temperature tap water through a microduct 65 at rates as low as about 0.1-0.2 liter per minute (about 0.025-0.05 gallon per minute). Such flow rates can be achieved with a pump having a power rating of significantly less than 1 horsepower, or even with a gravity feed system having sufficient head pressure.

Referring again to the embodiment illustrated in FIG. 2, one of the two flow passages 70 (depending whether the insert 20 is being used in a right-handed or left-handed cutting operation) receives coolant 37 from the source 36, and this flow passage 70 may be termed an inlet flow passage. The coolant 37 flows into one end of the microduct 65 via one of the connecting passages 75 and through the microduct 65. The coolant then exits the insert 20 via the connecting passage 75 and the flow passage 70 at the other end of the microduct 65, such that the other flow passage 70 may be termed an exhaust flow passage. When the insert 20 is indexed to cut with a new radiused corner 53, the coolant supply hose is plugged into one of the flow passages in the coolant flow circuit associated with the new corner.

Figure 3:
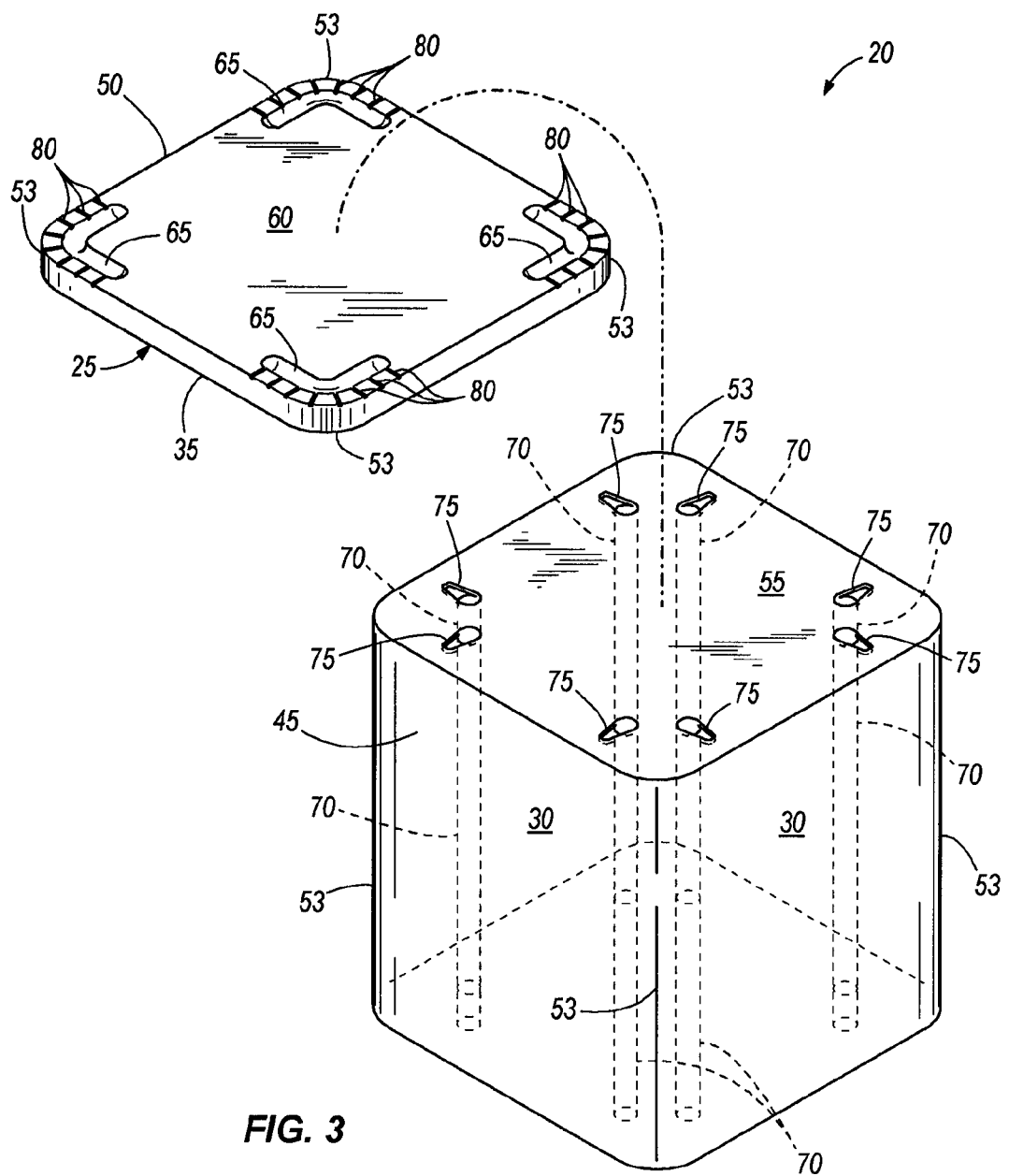
FIG. 3 is a perspective view of another embodiment of the cutting tool insert being assembled.

FIG. 3 illustrates a variation (referred to as "primary-secondary") on the embodiment illustrated in FIG. 2, in which secondary microducts 80 communicate between the primary microducts 65 and the flank faces 30 of the insert 20. The insert 20 in FIG. 3 is in all other respects substantially similar to that discussed above with reference to FIG. 2.

The secondary microducts 80 may be formed in either the base 45 or wafer 50 while pressing the green-state wafer 50 or by scratching the base 45 or wafer 50 with a rake having tines of sufficiently thin gauge to result in the secondary microducts 80. Again, because of the extremely small size of the secondary microducts 80, they are not illustrated to scale, but the secondary microducts 80 are of even smaller cross-sectional area than the microduct 65. For example, the secondary microducts 80 may be semicircular in cross-section and have radii in the range of 25-50 micrometers (0.025-0.050 millimeter). The cross-sectional area of the secondary microducts 80 may therefore be in the range of about 0.001-0.004 square millimeter.

The primary-secondary embodiment relies primarily upon the secondary microducts 80 to cool the cutting edge 35, and consequently the primary microduct 65 can be moved further away from the rake face 25, flank face 30, and cutting edge 35. For example, in one primary-secondary embodiment, the secondary microducts 65 may be 500 micrometers (0.500 millimeter) or further from the rake face 25 and flank face 30. Because the coolant 37 in this embodiment is intended to flow out the secondary microducts 80, one of the two flow passages 70 (depending whether the insert 20 is being used in a right-handed or left-handed cutting operation) receives coolant 37 from the source 36, and the other is plugged or blocked. This establishes the primary microduct 65 as a manifold with substantially constant pressure along its length. The coolant 37 consequently flows substantially equally into the secondary microducts 80. The secondary microducts 80 can therefore be referred to as exhaust conduits in this embodiment.

Figure 4:
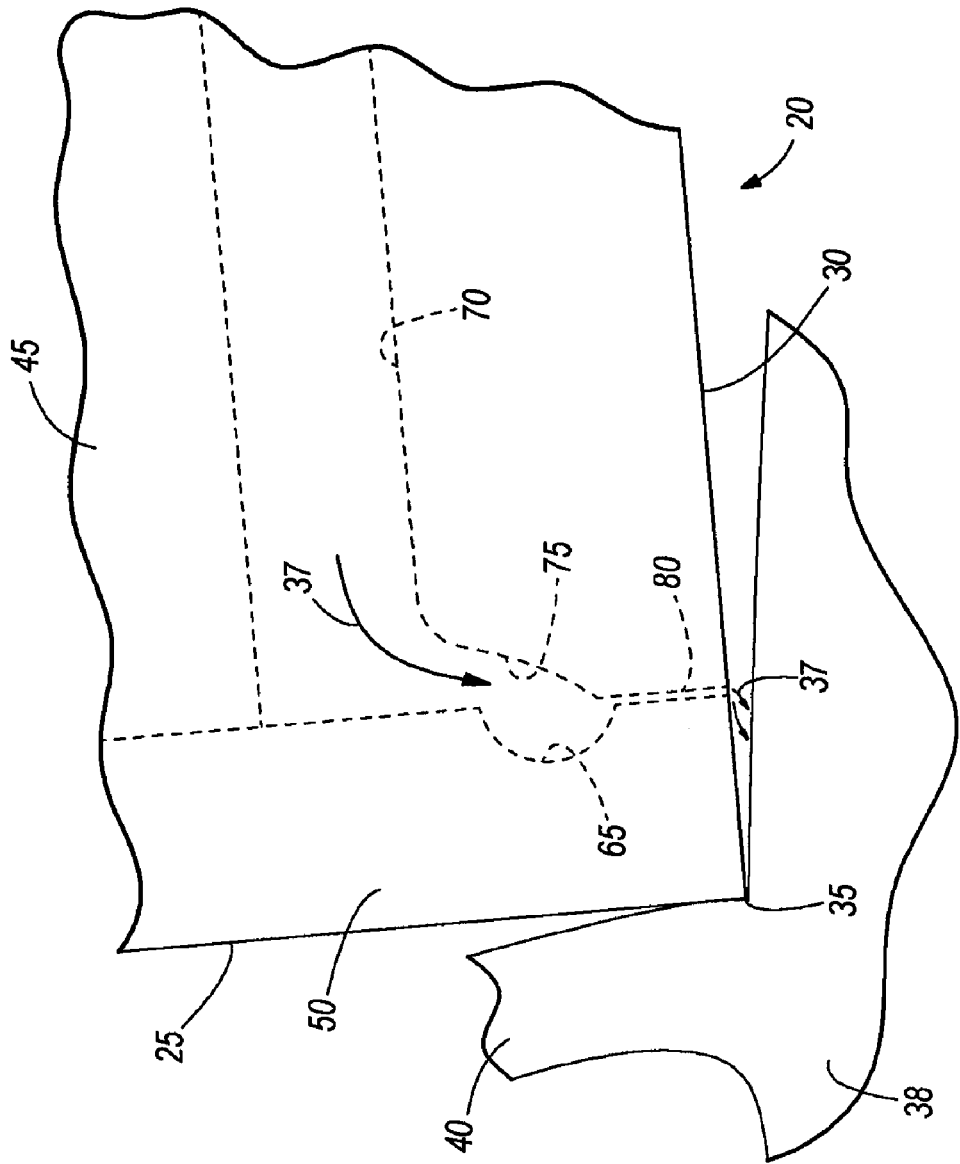
FIG. 4 is an enlarged side view of a portion of the embodiment illustrated in FIG. 3, during a cutting operation.

As illustrated in FIG. 4, the coolant 37 flows out of the secondary microducts 80 slightly behind the cutting edge 35 of the insert 20. As used herein, the term "behind the cutting edge" means through the flank face 30 of the insert 20, into the space between the flank face 30 and the work piece 38. While the secondary microducts 80 may in other embodiments extend through the rake face 25 and vent or exhaust the coolant 37 above the cutting edge 35, such secondary microducts 80 may be partially or entirely blocked by the chip 40.

The secondary microducts 80 act as nozzles for the coolant 37 being exhausted or vented from the insert 20. The coolant 37 pressure drops as it exits the secondary microducts 80 and quickly expands to atmospheric pressure. Depending on the pressure drop and type of coolant, the coolant 37 may vaporize as it exhausts, and such vaporization will be accompanied by a large temperature drop that will further cool the cutting edge 35 in particular. Depending on its properties and the conditions, a coolant 37 may completely or partially vaporize in the microducts 65, 80 or may not vaporize at all.

Figure 5A:
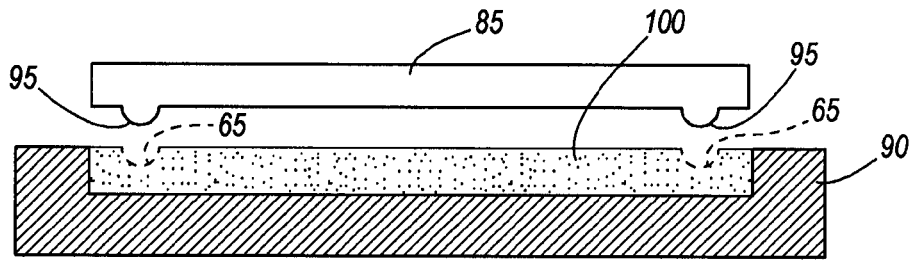
FIG. 5A is a side cross-sectional view of a mold for forming a wafer portion of the cutting tool insert.

FIG. 5A illustrates an exemplary basic mold setup for creating the wafer 50 of the insert 20. The setup includes a punch 85 and a die 90. The illustrated punch and die 85, 90 are used to create an insert 20 such as that illustrated in FIG. 2, which includes multiple microducts 65, and so the punch 85 includes multiple ribs 95 that are each of the proper size and shape to form an impression of a microduct 65.

The die 90 contains a sintering material 100, and the punch 85 compresses the sintering material 100 in the die 90 to form a green-state version of the wafer 50 with the microducts 65 imprinted therein. Wax or another binding agent may be mixed with the sintering material 100 to help hold the green-state wafer 50 together. The sintering material 100 may be any material having suitable material properties for a cutting tool insert, including by way of example and without limitation, carbide, high speed steel, and other tool-grade metals (e.g. steel alloys including at least one of molybdenum, chromium, tungsten, vanadium, cobalt, and carbon).

Figure 5B:
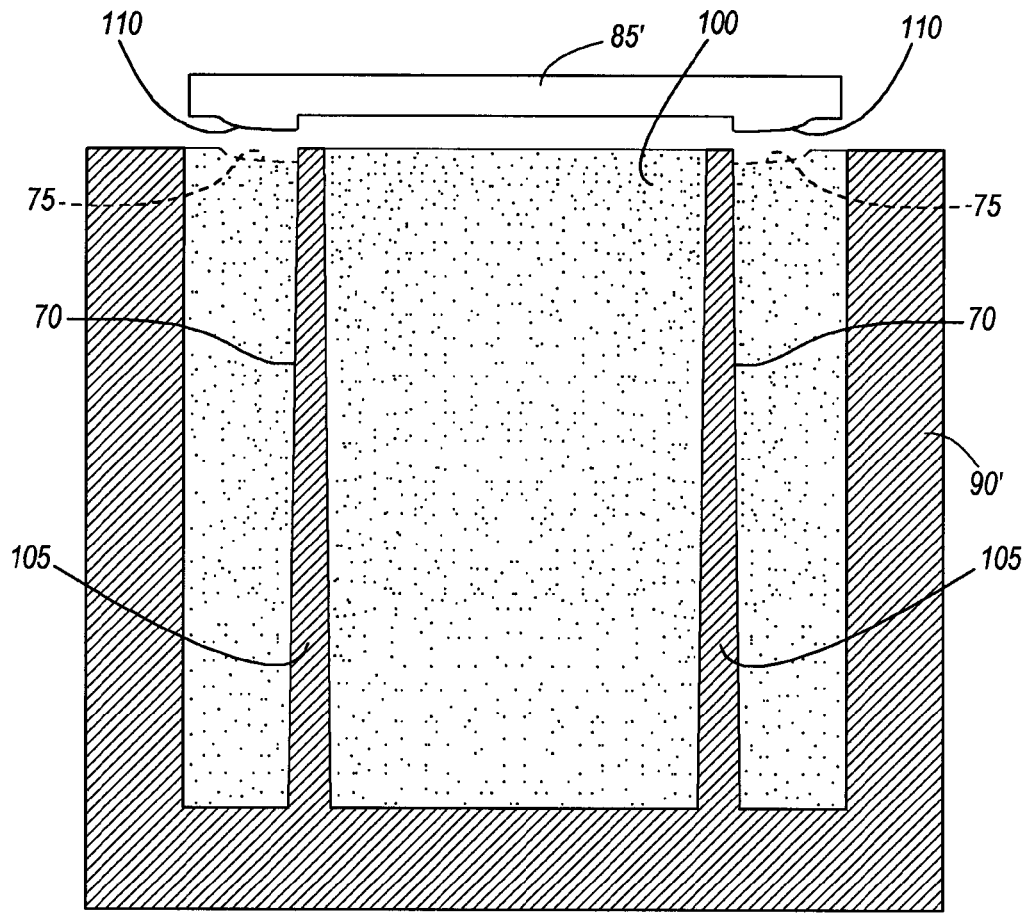
FIG. 5B is a side cross-sectional view of a mold for forming a base portion of the cutting tool insert.

FIG. 5B illustrates a setup for creating the base portion 45 of the insert 20. The setup illustrated in FIG. 5B includes a punch 85' and a die 90' containing similar sintering material 100 (with wax or other binding agent mixed in) as described above. The die 90' includes multiple projections 105 to form the multiple flow passages 70 in the embodiment illustrated in FIG. 2, and the punch 85' includes multiple projections 105 to form the multiple connecting passages 75. A green-state version of the base portion 45 of the insert 20 is formed when the punch 85' is pressed into the sintering material 100 in the die 90', and the projections and ribs 105, 110 define the flow passages 70 and connecting passages 75.

It will be understood by one of ordinary skill in the art that the presses 85, 85' may be modified in the event the microduct 65 is intended to be formed in the base portion 45 by removing the ribs 95 from the punch 85 for the wafer 50 and including the ribs 95 in the punch 85' for the base 45. For embodiments in which the microducts 65 are partially formed in the wafer 50 and partially formed in the base 45 (as in the embodiment described with respect to FIGS. 7A and 7B below), a modified version of the ribs 95 may be included in both presses 85, 85' for such purpose. Also, the connecting passages 75 may be formed in the wafer 50 (regardless of whether the microduct 65 is formed in the base 45 or wafer 50) by including the rib 110 in the punch 85 for the wafer 50. Either or both of the presses 85, 85' may also be further modified to include ribs for the purpose of creating the secondary microducts 80 in the base 45 and/or wafer 50. It will also be understood that in other embodiments, the peripheral walls of the dies 90, 90' may be fixed or stationary, the bottom surface of each die 90, 90' may be a movable punch (for ejecting the green-state version of the base 45 or wafer 50), and the projections 105 may be fixed or stationary cores or core pins.

Figure 6:
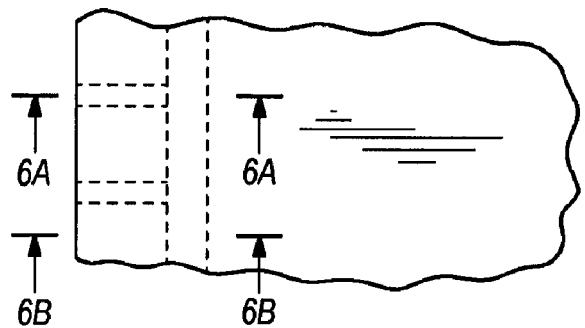
FIG. 6 is a view of a portion of another embodiment of the cutting tool insert.
Figure 6A:
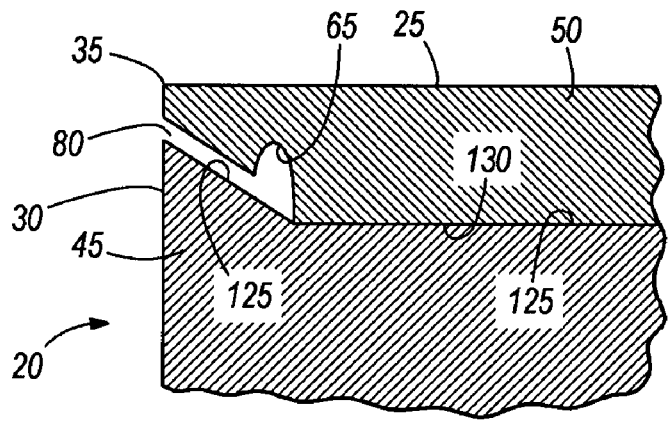
FIG. 6A is a cross-sectional view taken along line 6A-6A in FIG. 6.
Figure 6B:
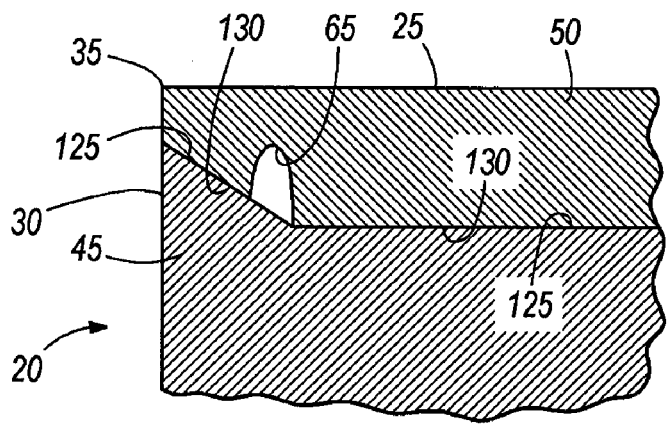
FIG. 6B is a cross-sectional view taken along line 6B-6B in FIG. 6.

FIGS. 6, 6A, and 6B illustrate a variation on the insert 20 in which the base 45 and wafer 50 have mating surfaces 125, 130 that are non-planar (unlike the generally planar mating surfaces 55, 60 in the constructions illustrated in FIGS. 2 and 3) to ensure proper alignment by causing the wafer 50 and base 45 to nest together. The nesting relationship keeps the wafer 50 and base 45 aligned before and during the sintering process. It is also envisioned that this nesting relationship could be employed in all other embodiments described herein. The illustrated secondary microducts 80 extend along the mating surface 125 of the base 45 at an angle that causes the venting or exhaust end of the secondary microducts 80 to be even closer to the cutting edge 55. While the illustrated insert 20 in FIGS. 6, 6A, and 6B includes the microduct 65 and secondary microducts 80 in the wafer 50, it is to be understood that the non-planar mating surfaces 125, 130 may be used in embodiments in which the microduct 65 and/or secondary ducts 80 are formed in the base 45 or in which no secondary ducts 80 are provided.

Figure 7A:
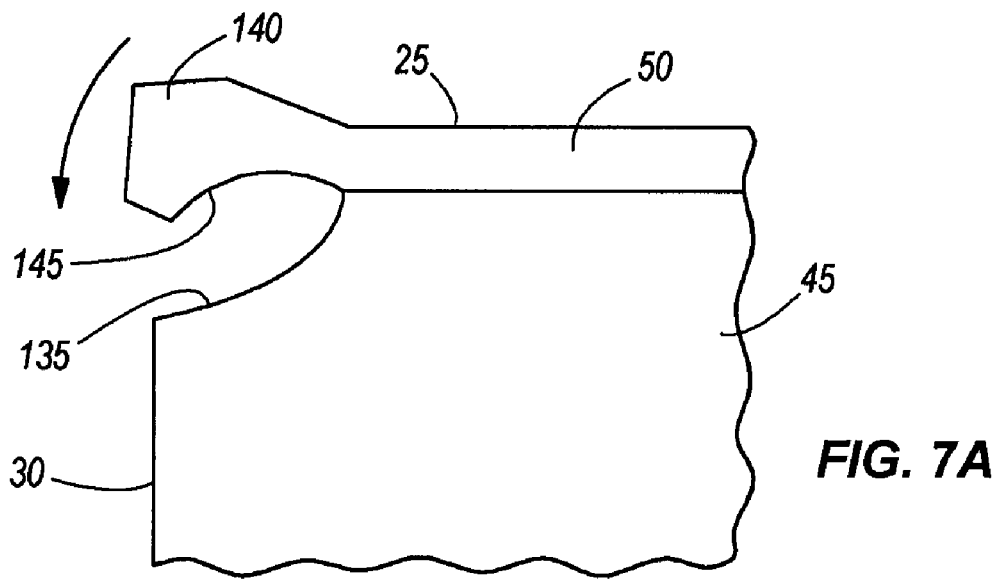
FIG. 7A is a side view of a portion of another embodiment of the cutting tool insert during assembly.
Figure 7B:
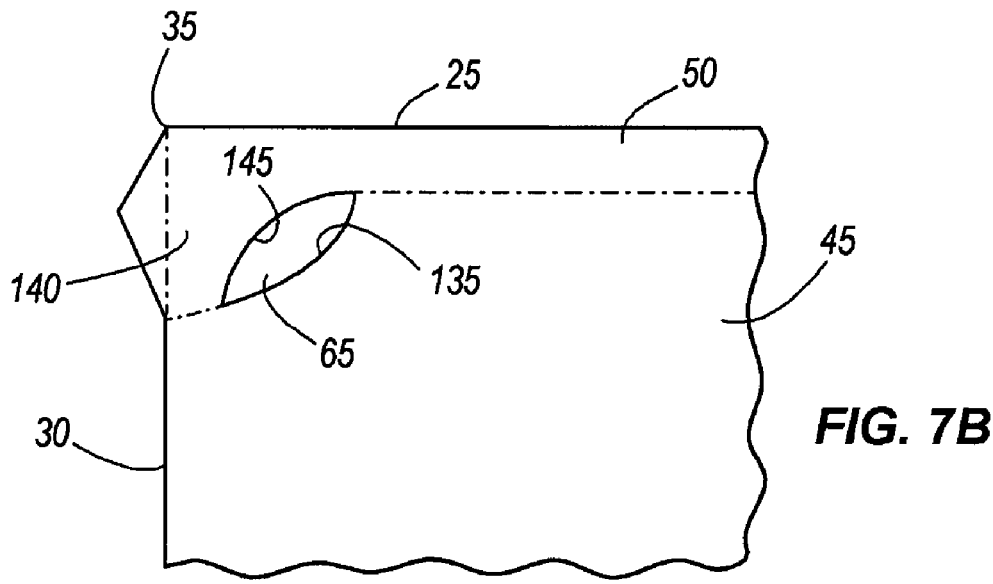
FIG. 7B is another side view of a portion of the embodiment of the cutting tool insert illustrated in FIG. 7B during assembly.

FIGS. 7A and 7B show another method of manufacturing the insert 20 in which the punch used to form the base 45 creates a filleted rabbet 135, and in which the wafer 50 is formed with an end 140 that defines a curved open channel 145. The wafer 50 is placed on the base 45 as illustrated in FIG. 7A, and when heat is applied, the end 140 of the wafer 50 sags down such that the curved open channel 145 extends across the rabbet 135 and the end 140 contacts the base 45, as illustrated in FIG. 7B. The result is that the rabbet 135 and channel 145 define the microduct 65. Any extra material along the end 140 of the wafer 50 can then be machined off to define the cutting edge 35. Secondary microducts 80 may be provided in this embodiment by scratching the edge of the rabbet 135 or the end 140 or incorporating ribs in the punch and/or die for that purpose.

Although the use of pressing to create green-state wafer 50 and base 45, followed by sintering has been discussed as a method for manufacturing the insert 20, the coolant flow circuits can in other embodiments be formed by a variety of other processes that have not been illustrated. For example, microducts could be micro-machined or ground into the green-state wafer 50, green-state base 45, or into a one-piece cutting tool insert that does not require the wafer and base components. Machined ducts would in most cases have a generally square cross-section. In other embodiments, the microducts may be formed by "hole-popping" such as micro-electrical discharge machining, or micro-EDM.

Various features and advantages of the invention are set forth in the following claims.

What is claimed is:

1. A cutting tool insert comprising:
a body defining a rake face, a flank face, and a cutting edge at an intersection of the rake and flank faces;
a cooling microduct within the body, a portion of the microduct extending along the cutting edge not more than 0.5 millimeter from the rake face and not more than 0.5 millimeter from the flank face, the cooling microduct having a cross-sectional area of not more than 1.0 square millimeter, the microduct being adapted to permit the flow of a coolant therethrough to transfer heat away from the cutting edge and extend the useful life of the insert; and
an inlet flow passage extending through the insert substantially perpendicular to the rake face and communicating between the microduct and a source of coolant for the delivery of coolant to the microduct.

2. The insert of claim 1, further comprising an exhaust flow passage extending through the insert substantially parallel to the inlet flow passage and communicating with the microduct for the flow of coolant out of the microduct and out of the insert, wherein the inlet and exhaust flow passages communicate with opposite ends of the microduct.

3. A cutting tool insert comprising:
a body defining a rake face, a flank face, and a cutting edge at an intersection of the rake and flank faces; and
a cooling microduct within the body, a portion of the microduct extending along the cutting-edge not more than 0.5 millimeter from the rake face and not more than 0.5 millimeter from the flank face, the cooling microduct having a cross-sectional area of not more than 1.0 square millimeter, the microduct being adapted to permit the flow of a coolant therethrough to transfer heat away from the cutting edge and extend the useful life of the insert; wherein
the microduct is a primary microduct, the insert further comprising at least one secondary microduct communicating between the microduct and the flank face to exhaust coolant from the insert behind the cutting edge.

4. A cutting tool insert comprising:
a body defining a rake face, a flank face, and a cutting edge at an intersection of the rake and flank faces; and
a cooling microduct within the body, a portion of the microduct extending along the cutting edge not more than 0.5 millimeter from the rake face and not more than 0.5 millimeter from the flank face, the cooling microduct having a cross-sectional area of not more than 1.0 square millimeter, the microduct being adapted to permit the flow of a coolant therethrough to transfer heat away from the cutting edge and extend the useful life of the insert; wherein
the body includes a plurality of radiused corners, each including a portion of the cutting edge; wherein the microduct includes a plurality of microducts, one microduct extending along each of the radiused corners not further than 0.5 millimeter from the rake and flank faces; the insert further comprising a plurality of supply flow conduits, each communicating with one end of one of the plurality of microducts; and a plurality of exhaust conduits, at least one of the exhaust conduits communicating with each microduct to exhaust coolant from the microduct; wherein the plurality of supply flow passages and exhaust passages establish a coolant circuit at each of the radiused corners for the supply and exhaust of coolant to and from the microducts.

5. The insert of claim 4, wherein the plurality of exhaust conduits includes a plurality of exhaust conduits within each of the coolant circuits communicating between the microduct in the coolant circuit and the flank face, such that coolant is exhausted behind the cutting edge through the plurality of exhaust conduits.

6. The insert of claim 5, wherein the plurality of exhaust conduits have cross-sectional areas no larger than 0.004 square millimeter.

7. A method for manufacturing a cutting tool insert, the method comprising:
forming a first portion having a first mating surface;
forming a second portion having a second mating surface;
defining an open channel in the first mating surface;
placing the first and second mating surfaces into contact with each other to cover the open channel to define a microduct;
metallurgically bonding the first and second portions together to define a cutting tool insert having therein the microduct; and
defining on the insert a rake face, a flank face, and cutting edge at an intersection of the rake and flank faces, the microduct being not more than 0.5 millimeter from each of the rake and flank faces; wherein
the steps of forming a first portion and forming a second portion include creating respective green-state first and second portions; and wherein the step of defining an open channel is performed by pressing the open channel into the green-state first portion.

8. The method of claim 1, wherein the step of forming the second portion further includes forming a flow passage in the second portion, and forming in one of the first and second portions a connecting channel to communicate between the flow passage and microduct.

9. A method for manufacturing a cutting tool insert, the method comprising:
forming a first portion having a first mating surface;
forming a second portion having a second mating surface;
defining an open channel in the first mating surface;
placing the first and second mating surfaces into contact with each other to cover the open channel to define a microduct;
metallurgically bonding the first and second portions together to define the insert having therein the microduct; and
defining on the insert a rake face, a flank face, and cutting edge at an intersection of the rake and flank faces, the microduct being not more than 0.5 millimeter from each of the rake and flank faces; wherein
the microduct is a primary microduct, the method further comprising forming a plurality of secondary open channels in one of the first and second mating surfaces prior to the metallurgically bonding step; wherein the metallurgically bonding step includes closing the secondary open channels to form a plurality of secondary microducts that communicate between the primary microduct and the flank face to exhaust coolant behind the cutting edge during operation of the cutting tool insert.

10. A method for manufacturing a cutting tool insert, the method comprising:
forming a first portion having a first mating surface;
forming a second portion having a second mating surface;
defining an open channel in the first mating surface;
forming a supply flow passage and an exhaust flow passage in the second portion;
placing the first and second mating surfaces into contact with each other to cover the open channel to define a microduct wherein placing the first and second mating surfaces into contact further includes placing the supply flow passage and exhaust flow passage in communication with the microduct;
metallurgically bonding the first and second portions together to define the insert having therein the microduct; and
defining on the insert a rake face, a flank face, and cutting edge at an intersection of the rake and flank faces, the microduct being not more than 0.5 millimeter from each of the rake and flank faces.

11. A method for extending the useful life of a cutting tool insert that has a rake face, a flank face, and a cutting edge at an intersection of the rake and flank faces, the method comprising:

providing a microduct within the insert, a portion of the microduct extending along the cutting edge and not more than 0.5 millimeter from each of the rake face and flank face, the microduct having a cross-sectional area of not more than 1.0 square millimeter;
providing a coolant supply passage in the insert in communication with one end of the microduct;
providing at least one exhaust conduit in communication with the microduct;
causing a coolant to flow through a portion of the insert through the supply passage and into the microduct;
causing the coolant to flow through the microduct to remove heat energy from the cutting edge during cutting operations; and
causing the coolant to exhaust from the insert through the at least one exhaust conduit.

12. The method of claim 11, wherein the providing a microduct step includes forming first and second green-state portions having respective first and second mating surfaces; forming an open channel in the first mating surface; and sintering the first and second portions together with the first and second mating surfaces against each other such that the open channel is closed to form the microduct.

13. The method of claim 11, wherein the step of causing a coolant to flow includes causing coolant to flow through the duct at a flow rate less than about 0.2 liter per minute.

14. The method of claim 11, wherein the step of providing at least one exhaust conduit includes providing a plurality of secondary microducts in communication between the microduct and the flank face, the secondary microducts having cross-sectional areas no larger than 0.004 square millimeter, the method further comprising venting coolant from the insert through the secondary microducts behind a cutting edge of the insert.

15. The method of claim 11, wherein the step of providing at least one exhaust conduit includes providing a plurality of secondary microducts in communication between the microduct and the rake face, the secondary microducts having cross-sectional areas no larger than 0.004 square millimeter, the method further comprising venting coolant from the insert through the secondary microducts above a cutting edge of the insert.

16. The method of claim 11, wherein the step of providing at least one exhaust conduit includes venting coolant near the cutting edge such that the coolant vaporizes near the cutting edge.

* * * * *